(12) United States Patent
Bivens et al.

(10) Patent No.: US 7,941,293 B2
(45) Date of Patent: *May 10, 2011

(54) APPARATUS OF CAPACITY LEARNING FOR COMPUTER SYSTEMS AND APPLICATIONS

(75) Inventors: John A. Bivens, Ossining, NY (US); Peter Yocom, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/137,953

(22) Filed: Jun. 12, 2008

(65) Prior Publication Data

US 2008/0249746 A1  Oct. 9, 2008

Related U.S. Application Data

(63) Continuation of application No. 11/157,090, filed on Jun. 20, 2005, now Pat. No. 7,392,159.

(51) Int. Cl.
*G06F 19/00* (2006.01)
*G06F 17/40* (2006.01)

(52) U.S. Cl. ............... 702/182; 702/187; 702/189

(58) Field of Classification Search ............... 700/1, 28, 700/29, 30, 31, 32, 33, 34, 90, 95, 108, 111, 700/117, 159, 174; 702/1, 127, 182, 186, 702/187, 189; 705/1.1, 7, 11, 400; 718/1, 718/100

See application file for complete search history.

(56) References Cited

U.S. PATENT DOCUMENTS

| | | | | |
|---|---|---|---|---|
| 2,883,255 A * | 4/1959 | Anderson | ....................... | 346/34 |
| 5,745,880 A * | 4/1998 | Strothmann | ....................... | 705/7 |
| 5,806,011 A * | 9/1998 | Azzaro et al. | ................... | 701/99 |
| 6,219,654 B1 * | 4/2001 | Ruffin | ........................... | 705/400 |
| 6,260,020 B1 * | 7/2001 | Ruffin et al. | ....................... | 705/7 |
| 6,526,387 B1 * | 2/2003 | Ruffin et al. | ....................... | 705/7 |
| 6,587,833 B1 * | 7/2003 | Ruffin et al. | .................... | 705/11 |
| 6,968,324 B1 * | 11/2005 | Ruffin et al. | ....................... | 705/400 |
| 7,017,060 B2 * | 3/2006 | Therien et al. | ................. | 713/323 |
| 7,131,015 B2 * | 10/2006 | Flautner et al. | ................ | 713/320 |
| 7,194,385 B2 * | 3/2007 | Flautner et al. | ................ | 702/186 |
| 7,209,863 B2 * | 4/2007 | Fukuda et al. | ................. | 702/186 |
| 7,350,186 B2 * | 3/2008 | Coleman et al. | ................ | 717/103 |
| 7,392,159 B2 * | 6/2008 | Bivens et al. | ................. | 702/186 |
| 7,512,820 B2 * | 3/2009 | Flautner et al. | ................ | 713/320 |
| 2004/0181794 A1 * | 9/2004 | Coleman et al. | ............. | 718/104 |
| 2004/0210418 A1 * | 10/2004 | Fukuda et al. | ................. | 702/182 |
| 2006/0287739 A1 * | 12/2006 | Bivens et al. | ..................... | 700/32 |
| 2007/0011476 A1 * | 1/2007 | Flautner et al. | ................ | 713/300 |
| 2007/0192473 A1 * | 8/2007 | Fukuda et al. | ................. | 709/223 |

FOREIGN PATENT DOCUMENTS

JP       7-210239 A  *  8/1995

* cited by examiner

*Primary Examiner* — Edward R Cosimano
(74) *Attorney, Agent, or Firm* — Michael J. Buchenhorner; Derek S. Jennings

(57) ABSTRACT

The present invention provides a system for determining a metric of capacity in computing systems and computer applications. Capacity in this sense refers to the ability of computer systems and computer applications to perform work. Many applications and multi-hop system strategies could benefit from understanding the amount of work a particular system or application is capable of performing. A metric such as this can be very difficult to calculate due to widely varying system hardware, operating system architectures, and application behavior/performance.

2 Claims, 5 Drawing Sheets

APPARATUS OF CAPACITY LEARNING FOR COMPUTER SYSTEMS AND APPLICATIONS

CROSS-REFERENCE TO RELATED APPLICATIONS

This application is a continuation of, and claims priority from, commonly-owned, U.S. application Ser. No. 11/157,090, filed on Jun. 20, 2005, now U.S. Pat. No. 7,392,159, which is incorporated by reference by in its entirety.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention generally relates to information processing systems and more specifically to a method of capacity estimation in computing systems and computer applications.

BACKGROUND OF THE INVENTION

Existing technologies for quantifying the capabilities of a particular system include static and dynamic methods. Static methods determine the capacity by static metrics usually hardware stats such as the central processing unit (CPU) speed, the CPU MIPS (millions of instructions per second) metrics, and the amount of memory available. A major problem with these static methods is that the processing capacity of a system can change depending on what the system administrator intends to run on it. A dynamic approach may be better at providing accurate capacity estimates in real-time environments. Secondly, different applications use system resources differently. This can mean that there is not a direct relationship between CPU speed and the capacity of a particular machine versus another to do a particular type of work.

Dynamic methods assume the capacity may change and determine the current capacity of the system taking into consideration that current applications or operating system processes may affect this capacity. Some dynamic methods are set forth below:

1) Remaining CPU utilization: In this method, a maximum CPU utilization is assumed (usually 100%). The difference between the maximum and the current CPU utilization would be considered the remaining capacity. If multiple CPUs exist on a system, this remaining capacity available on all CPUs would then be summed together to form the capacity of the system. There are however several problems with this approach: (a) CPUs and the operating systems that use them are different and do not guarantee that the remaining CPU will give the administrator an accurate or consistent view of the remaining capacity. (b) The bottleneck limiting the capacity of a system may not be the CPU.

2) Protocol handshake measurements: This method is used to estimate the capacity of network applications to handle more work by measuring the speed in which the network layer of the system can establish a network connection to a port the application is listening on. The problem with this approach is that it only evaluates the network and the network stack of the system. It has little or no bearing on the system's ability or capacity to process the work once it arrives.

The embodiment of the invention discuss herein provides several benefits over current techniques. Capacity estimates can be different depending on the platform and processes currently running on that platform. In addition, the behavior of the application itself may require resources in a manner which is difficult for static hardware resources to correlate to. This method would therefore be more accurate than the static methods listed above. The method also has several advantages over the listed dynamic methods for system capacity estimation. The remaining CPU utilization method makes assumptions that every system can achieve the same maximum utilization. It also assumes that the bottleneck of system capacity is the CPU.

Lastly, this method also assumes that the performance of the system or application at high utilization values is acceptable to the administrator. There is a need for a method that solves these problems by learning the maximum capacity levels through the completion of administrator-defined successful transactions. Many applications and multi-hop system strategies could benefit from understanding the amount of work a particular system or application is capable of performing. A metric such as this can be very difficult to calculate due to widely varying system hardware, operating system architectures, application behavior/performance, and so forth.

SUMMARY OF THE INVENTION

Briefly, according to an embodiment of the invention a system estimates the processing capacity in computing systems and computer applications. Capacity in this sense refers to the ability of computer systems and computer applications to perform work. We discuss a system that uses capacity estimation to learn the capacity of an application or system with respect to the work asked of the system and the resources used by the application in question.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF EMBODIMENTS

Figure 1:
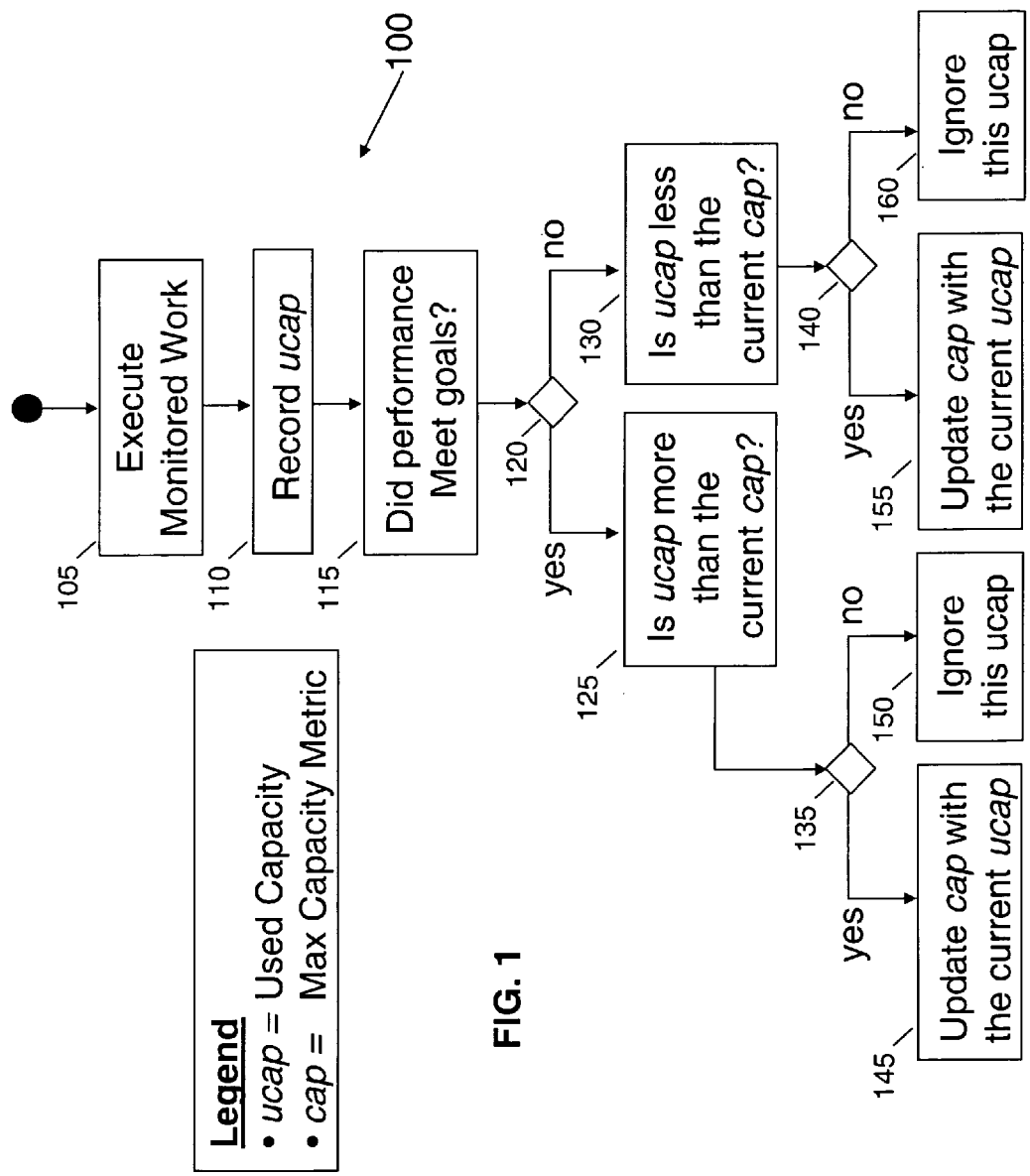
FIG. 1 is a flowchart outlining an exemplary operation of the present invention when developing and maintaining a capacity estimate based on performance behavior.

We describe an embodiment of the invention that provides several benefits over current techniques. Capacity estimates can be different depending on the platform and processes currently running on that platform. In addition, the behavior of the application itself may require resources in a manner which is difficult for static hardware resources to correlate to. This method would therefore be more accurate than the static methods listed above. The method also has several advantages over the listed dynamic methods for system capacity estimation. The remaining CPU utilization method makes assumptions that every system can achieve the same maximum utilization. It also assumes that the bottleneck of system capacity is the CPU.

Lastly, this method also assumes that the performance of the system or application at high utilization values is acceptable to the administrator. There is a need for a method that solves these problems by learning the maximum capacity levels through the completion of administrator-defined successful transactions. Many applications and multi-hop system strategies could benefit from understanding the amount of work a particular system or application is capable of performing. A metric such as this can be very difficult to calculate due to widely varying system hardware, operating system architectures, application behavior/performance, and the like. According to one embodiment of the invention, a method of developing real time dynamic capacity estimations for computer systems and applications provides capacity estimates that can be formed using performance related data, and capacity estimates that can be formed using just system resource related data.

Computing the capacity of an application or system as the maximum tolerable resource usage using the techniques discussed here produces capacity metrics that may be used as part of a solution to a variety of problems. Determining the resource usage pace is an additional way of comparing system capacity levels which adapts a method using one or more embodiments to deal with a tremendous variety of heterogeneous systems and system hardware components.

The term "capacity" as used in this document refers to a measure formed by statistically combining any number of system or application resource metrics. Examples of these system resource metrics include but are not limited to: CPU utilization; Memory usage; Disk usage; and IO (input/output) delays.

These metrics could be combined to form a statistical capacity measure according to any method appropriate for the system or application. An example of such a statistical combination can be found below in Equation 1:

$$\text{e.g. capacity} = (Coef_{CPU}) \times res_{CPU} + (Coef_{MEM}) \times res_{MEM} + (Coef_{IO}) \times res_{IO} \quad \text{Equation 1}$$

where:

$$Coef_{CPU} = \frac{W_{CPU}}{W_{CPU} + W_{MEM} + W_{IO}},$$

$W_{CPU}$ = weight given to the CPU capacity, $$Coef_{MEM} = \frac{W_{MEM}}{W_{CPU} + W_{MEM} + W_{IO}},$$

$W_{MEM}$ = weight given to the Memory capacity, $$Coef_{IO} = \frac{W_{IO}}{W_{CPU} + W_{MEM} + W_{IO}},$$

$W_{IO}$ = weight given to the IO capacity.

$res_{CPU}$ = a capacity metric for the

CPU resource (e.g. a maximum of CPU utilization that should be used by the system or application, [e.g. 80%]).

$res_{MEM}$ = a capacity metric for the Memory resource (e.g. a maximum of Memory that should be used by the system or application, [e.g. 256 MB]).

$res_{IO}$ = a capacity metric for the IO resource (e.g. a maximum of number of Page Faults that can be used by the system or application in a particular interval, [e.g. 10 page faults])

It is important to note that the above formula for a compound capacity metric (Equation 1) could easily be restricted to only one or two of these resource statistics by assigning a weight of zero for those resource statistics that should be eliminated.

Notations used herein include:

ucap=used capacity: The amount of capacity being used at a particular point of time. This is computed in a similar fashion as the example capacity in Equation 1, using current resource usage values for res values.

capacity learning system: The system processing the statistics to determine the system or application capacity.

Using Performance Statistics to Develop Capacity Estimations:

If performance information is available for a particular system or applications on that system, it can be used to estimate the capacity of the system and the applications on that system. In these systems, an administrator could set a performance related goal, and view the capacity as the resource limits that may be exploited by the system or application while still meeting the goals. Application-level performance data can be especially helpful because capacity estimates created using this data represent the capacity for this particular application on this particular system to meet goals purposefully set by an administrator.

Referring to FIG. 1, there is shown a flowchart of a process 100 of developing and maintaining capacity estimates using performance related statistics. In step 105, the capacity metric can be formed and maintained in real-time, while executing monitored work. In step 110, while processing the current workload, the capacity learning system regularly records and processes the statistics to compute and record a ucap. At that time, in steps 115 and 120 the current system or application performance is obtained and compared to the performance goals set by the administrator.

If the performance goal was achieved but ucap is larger than the current maximum capacity, in steps 125 and 135 the capacity learning system infers this to mean that the capacity for this application has increased and in step 145 update the current maximum capacity with the new ucap value. If the performance goal was met, but ucap is not larger than the current maximum capacity, this ucap is ignored in step 150.

Conversely, if the performance goal was not achieved but ucap is smaller than the current maximum capacity, in steps 130 and 140 and 155 the capacity learning system infers this to mean that the capacity for this application has decreased and update the current maximum capacity with the new ucap value. Updating the current maximum capacity can be any statistical combination of the current ucap value and previous maximum capacity values (e.g. a weighted statistical average). This small step can be performed at frequent monitoring or management intervals to dynamically track system or application capacity. If performance goals were not met, but the ucap is greater than the current capacity, then in step 160 the capacity learning system ignores the ucap.

Figure 2:
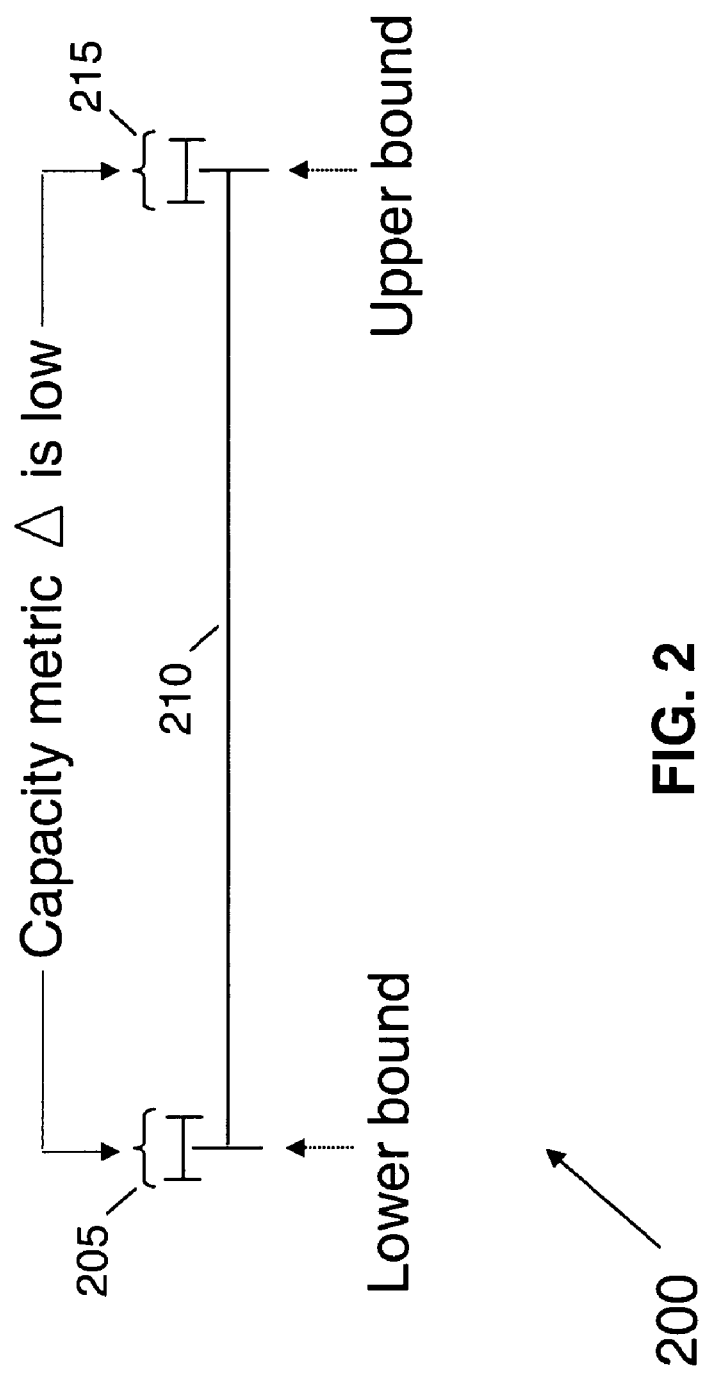
FIG. 2 is an exemplary diagram of the statistical range of capacity formed by observing system or application resource usage.

Using Only Resource Usage Statistics to Develop Capacity Estimations:

In the event that performance related statistics are not available, a slightly different strategy using only resource usage statistics may be used to compute a capacity metric for computer systems and applications. In this case, the capacity learning system will still calculate ucap; however, it will now view the boundary of maximum capacity as the range of the ucap where the amount of work being given to the system or application is rising, but the change in ucap is very small (below a low change threshold). Referring to FIG. 2, there is shown an exemplary diagram 200 of the statistical range of capacity formed by observing system or application resource usage.

When using only resource usage statistics to develop capacity estimates, the capacity learning system will most likely come across at least two such instances where the change in ucap is below the low change threshold, the lower bound of capacity (205) and the upper bound (215). It is reasonable to assume that the capacity learning system could encounter additional periods of rising workload and ucap changes falling under the low change threshold between the actual lower bounds and upper bounds (in the area of 210). Bootstrapping methods which may help avoid such a problem will be discussed below.

Figure 3:
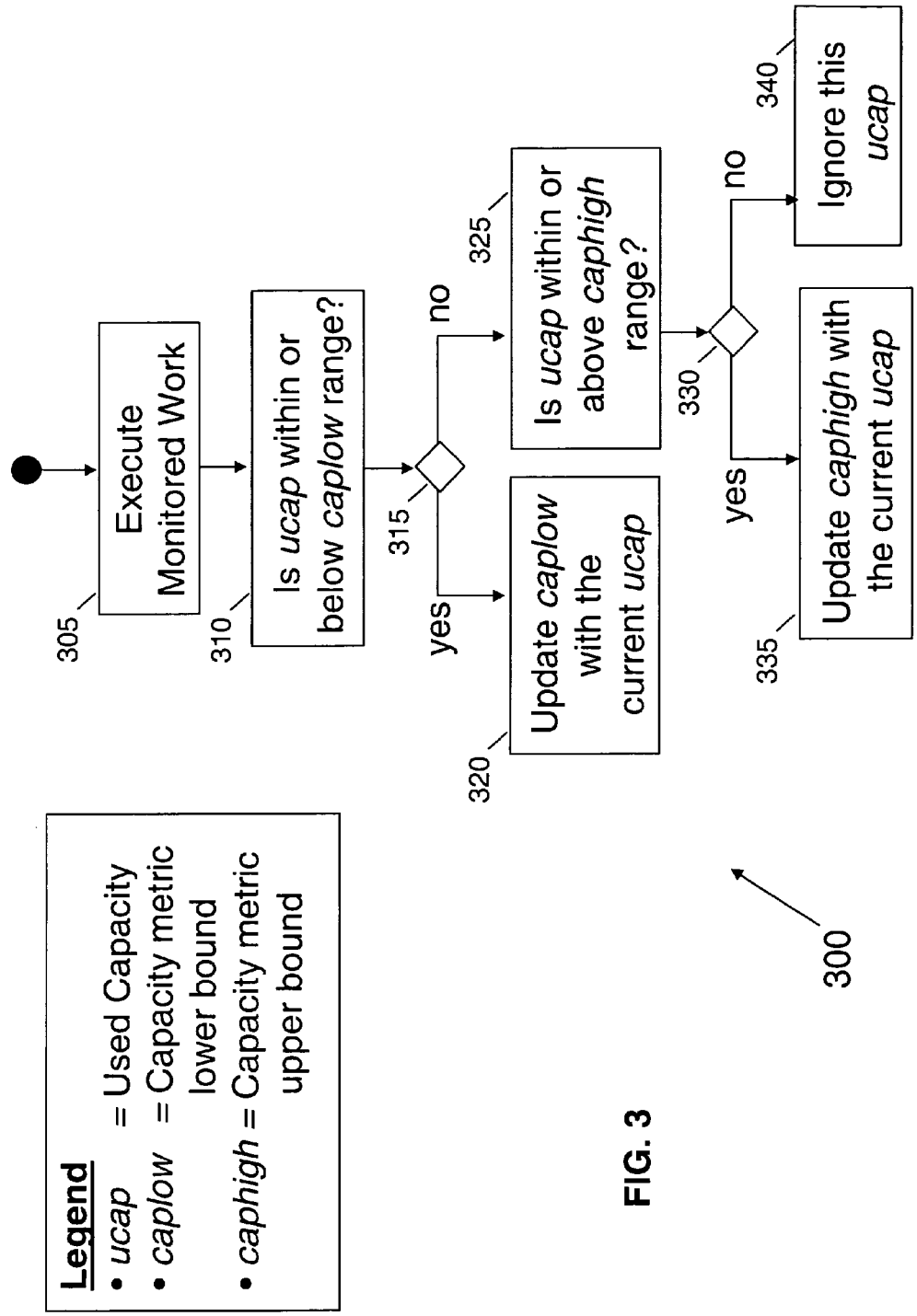
FIG. 3 is a flowchart outlining an exemplary operation of an embodiment of the invention when developing and maintaining a capacity estimate based on system or application resource usage.

Referring to FIG. 3, there is shown a flow chart 300 illustrating a process of developing the system or application capacity metric. This is also a process that runs in real-time, during the execution of monitored work. Step 305 executes monitored work. As mentioned above, both the lower bound and upper bounds will be maintained as ranges of low change in ucap. These ranges can be can be kept and maintained in a variety of methods, including but not limited to: (1) arrays of statistical data from intervals of increasing work; and/or (2) average maximum and minimum capacity with corresponding standard deviations.

Steps 310 and 315 determine whether ucap is within or below caplow range. If the current ucap is within or below the lower bound range of capacity, in step 320 the lower bound range will be updated to reflect the new ucap. The lower bound may be updated in the following manner: (1) If the ucap is within the lower bound range, the average lower bound value will be recomputed to include the new value of ucap; and (2) If the ucap is lower than the lower bound range, the lower bound range will recomputed and possibly recentered to a different ucap value.

If ucap is not within or below caplow range in steps 310 and 315, then steps 325 and 330 determine whether ucap is within or above caphigh range where caphigh is the upper bound of the capacity metric. If the current ucap is within or above the upper bound range of capacity (325), the upper bound range will be updated to reflect the new ucap in step 355 otherwise the ucap is ignored in step 340. In step 335, the upper bound may be updated in the following manner:

If the ucap is within the upper bound range, the average upper bound value will be recomputed to include the new value of ucap.

If the ucap is higher than the upper bound range, the data for this interval will be kept to possibly be used in the formation of a new higher upper bound range. If sufficient data samples fall close this new interval's data sample, a new upper bound range should be established.

If the ucap is not within or above the caphigh range, step 340 ignores this ucap. With either of these strategies, capacity estimation using performance data or using only resource usage data, current capacity usage values (ucap) can be subtracted from the maximum capacity value to form a remaining capacity metric. The dynamic nature of this process reflects the dynamic nature of computer systems. As other applications and system processes are started and stopped, the overall capacity of the system to perform work changes. This method will allow managers of such systems to adapt to these changes in an autonomic, self-driven manner.

Bootstrapping Capacity Learning Phases to Increase Accuracy:

The methods described above are methods of updating the capacity values as they change. To improve performance, the capacity learning system may want to form purposeful "capacity learning phases" to develop initial capacity estimates and recalibrate the capacity values at some regular interval. The process for these capacity learning phases is composed of several capacity learning intervals where the capacity learning system varies the workload sent to the system or application under analysis for the purpose of quickly developing the capacity boundaries.

Figure 4:
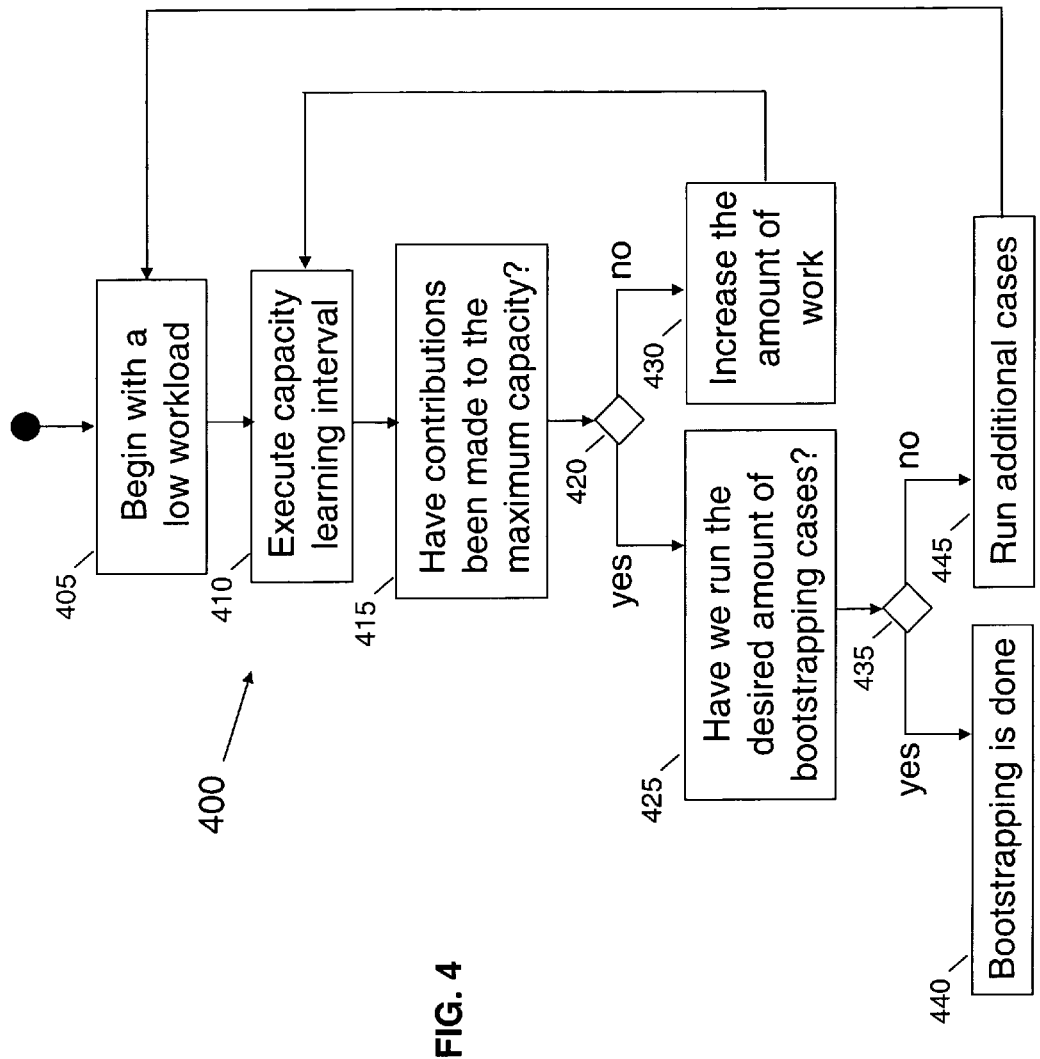
FIG. 4 is a flowchart outlining an exemplary operation of another embodiment of the invention when bootstrapping to develop accurate initial and recalibration capacity estimates.

Referring to FIG. 4, a process 400 is illustrated. In step 405, the system begins with a low workload. Each capacity learning interval of the capacity learning phase will begin with a low workload directed to the system or application in question. In step 410, the appropriate capacity learning process will be followed depending on the type of data available: (a) if performance related data is available, the capacity learning system will follow the process described in the flowchart of FIG. 1, or (b) if only resource usage data is available, the capacity learning system will follow the process described in the flowchart of FIG. 3.

Steps 415 and 420 determine whether contributions have been made to the maximum capacity. Steps 425 and 435 determine whether the desired amount of iterations have been run. If no changes were made to the upper bound capacity estimate during this particular interval then in step 430, the capacity learning system will increase the workload for the next interval. If this interval's statistics made contributions to the upper bound successfully, then the process will start all over again until enough iterations have been completed (following steps 415, 420, 425, 435, through 440). If the desired amount of bootstrapping cases have not been run as determined at step 435, then in step 445 the process continues by running additional cases. Else, the bootstrapping process ends at step 440 and the results are statistically combined. Because these "capacity learning phases" use statistics from real-time data, they can be scheduled for systems while they are online and not cause a break in service.

Dealing with Ambiguous Results from Learning:

We will establish a learning change threshold to determine if the statistics used to form the capacity estimate do not change enough (difference between lower and upper bounds is smaller than some threshold). If this happens, we can infer one of the following: (a) The system is not affected by the application(s) to which work has been sent. One reason this could happen is if the system is caught in an error state and simply returning an error message. (b) There is not enough work being sent to the system. In this case, we may not learn much about how much stress the system experiences because of the amount of work we tried to send to the system. (c) The system is already operating at capacity.

To combat these conditions, we will observe similar metrics for other systems doing the same type of work. We assume that a system capacity metric would be useful when comparing systems, so multiple systems may be available for this analysis. In these cases when the system statistics never change, we will take the following course of action:

(1) If the percentage of total systems below the learning change threshold in a group performing similar work is sufficiently low, we will assume that the lack of change in these systems is due to the system already operating at capacity, or the system is in an error state. In this case, we will fix the capacity upper bound of these servers (the systems below the learning change threshold) to be a percentage less than 100% (e.g. 75%) of the lowest system capacity upper bound from those systems above the learning threshold.

(2) If the percentage of total systems below the learning change threshold is sufficiently high, we will assume that the lack of change in all systems is because of the lack of work sent to those systems. In this case, we will fix the capacity upper bound of these systems (the systems below the learning change threshold) to be a percentage higher than 100% (possibly 110%) of the highest system upper bound from those servers above the learning threshold. If all systems are below the learning change threshold, the capacity for each of the servers is returned to its initial configuration. When one of these special cases is encountered, it may benefit the capacity learning system to schedule additional capacity learning phases.

Determining Resource Usage Pace

In addition to determining the maximum resource usage before convergence or intolerable performance, one could also use the data gathered during the learning phase iterations to develop metrics describing the resource usage pace, or how fast it would take the system or application to reach maximum tolerable resource usage. Systems which may be at the same resource utilization and have the same maximum resource utilization may still differ a great deal when determining how long it may take for each system to reach the maximum.

Figure 5:
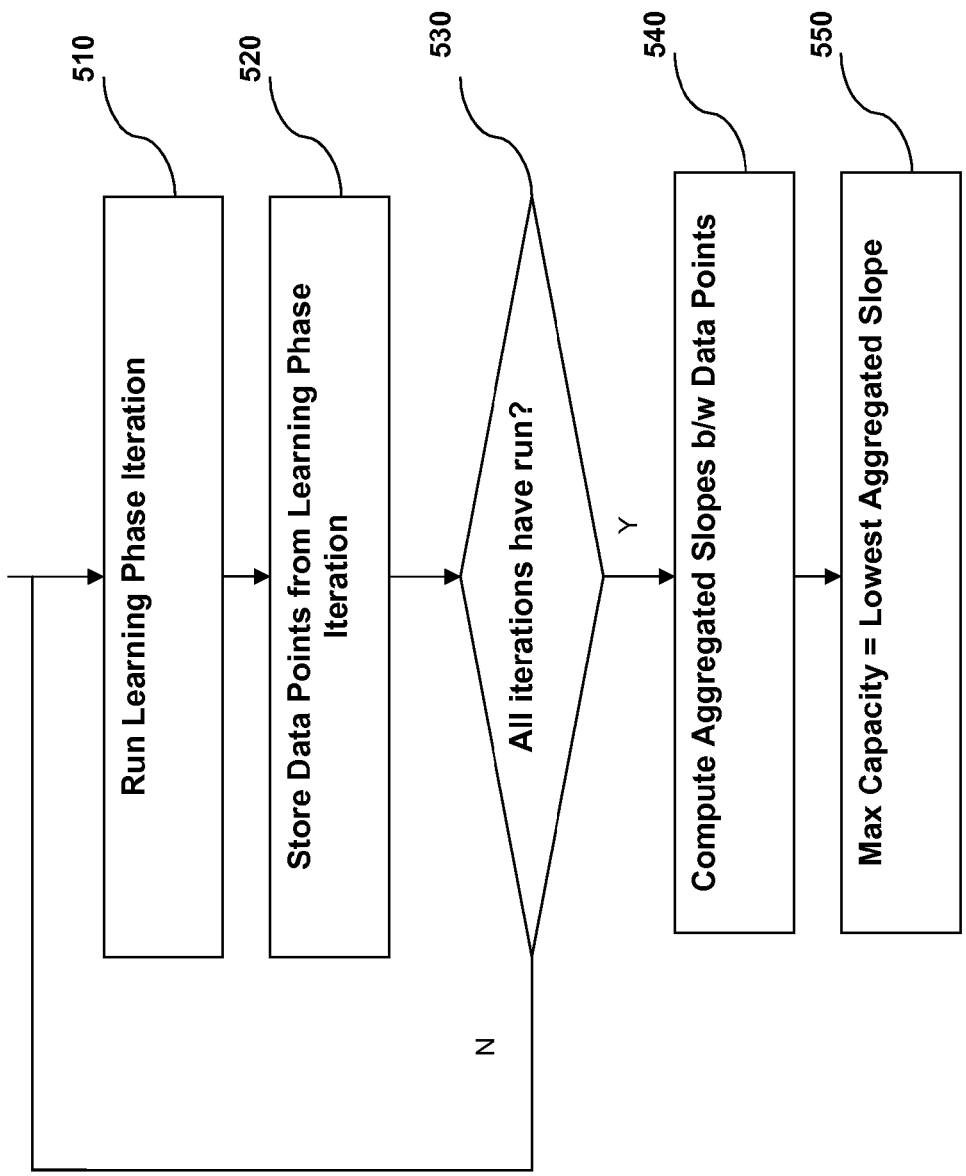
FIG. 5 is a flowchart outlining an exemplary embodiment of another embodiment of the invention to determine a maximum tolerable resource usage pace.

Referring to FIG. 5, the resource usage pace is determined by running a learning iteration in step 510 and storing the data points developed from the iteration in step 520. Next, in step 530 a check is performed to determine if all iterations have been run. If so, in step 540 the process continues by computing the aggregated slopes between the data points developed during the running of each learning phase iteration and then in step 550 equating the higher capacity with the system which has the lowest aggregate slope (slowest pace). If there remain iterations to be run, the process loops back to step 510.

Therefore, while there has been described what is presently considered to be the preferred embodiment, it will understood by those skilled in the art that other modifications can be made within the spirit of the invention.

We claim:

1. A computer program product tangibly embodied on a computer readable storage medium and comprising program code, which when executed, enables a computer to:
   receive a user-defined set of processing goals for an information processing system;
   receive a maximum capacity metric for system processing capacity, the maximum capacity metric correlating to the user-defined set of processing goals;
   monitor real-time processing for determining a used capacity of the system;
   record the used capacity of the system;
   determine whether the real-time processing meets the user-defined set of processing goals;
   if the real-time processing meets the user-defined set of processing goals, determine whether the used capacity is greater than the maximum capacity metric; and
   if the used capacity is greater than the maximum capacity metric, update the maximum capacity metric with the used capacity;
   record the updated maximum capacity metric; and
   use the updated maximum capacity metric as the determined processing capacity of the information processing system in further processing.

2. An information processing machine comprising a processor configured for:
   receiving a user-defined set of processing goals for the system;
   receiving a maximum capacity metric for system processing capacity, the maximum capacity metric correlating to the user-defined set of processing goals;
   monitoring real-time processing for determining a used capacity of the system;
   recording the used capacity of the system;
   determining whether the real-time processing meets the user-defined set of processing goals;
   if the real-time processing meets the user-defined set of processing goals, determining whether the used capacity is greater than the maximum capacity metric; and
   if the used capacity is greater than the maximum capacity metric, updating the maximum capacity metric with the used capacity;
   recording the updated maximum capacity metric; and
   using the updated maximum capacity metric as the determined processing capacity of the information processing system in further processing.

* * * * *